(12) United States Patent
Cooper et al.

(10) Patent No.: US 12,208,857 B2
(45) Date of Patent: Jan. 28, 2025

(54) HAND BICYCLE PEDAL

(71) Applicants: United States Goverment as represented by the Department of Veterans Affairs, Washington, DC (US); University of Pittsburgh—Of The Commonwealth System of Higher Education, Pittsburgh, PA (US)

(72) Inventors: Rory A. Cooper, Gibsonia, PA (US); Benjamin Gebrosky, Gibsonia, PA (US)

(73) Assignees: United States Government as represented by the Department of Veterans Affairs, Washington, DC (US); University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 611 days.

(21) Appl. No.: 17/610,459

(22) PCT Filed: May 12, 2020

(86) PCT No.: PCT/US2020/032428
§ 371 (c)(1),
(2) Date: Nov. 11, 2021

(87) PCT Pub. No.: WO2020/231965
PCT Pub. Date: Nov. 19, 2020

(65) Prior Publication Data
US 2022/0250712 A1 Aug. 11, 2022

Related U.S. Application Data

(60) Provisional application No. 62/847,035, filed on May 13, 2019.

(51) Int. Cl.
*B62M 3/14* (2006.01)
*B62M 1/14* (2006.01)

(52) U.S. Cl.
CPC ............... *B62M 3/14* (2013.01); *B62M 1/14* (2013.01)

(58) Field of Classification Search
CPC ................................. B62M 1/14; B62M 3/14
See application file for complete search history.

(56) References Cited

U.S. PATENT DOCUMENTS 5,853,184 A * 12/1998 Lofgren .................... B62K 3/16
280/250
6,257,607 B1 * 7/2001 Franks ...................... B62M 1/14
280/242.1
(Continued)

FOREIGN PATENT DOCUMENTS

DE 102014112687 A1 * 3/2016 ............. A61G 5/027

*Primary Examiner* — Kevin Hurley
*Assistant Examiner* — Hosam Shabara
(74) *Attorney, Agent, or Firm* — Ballard Spahr LLP

(57) ABSTRACT

Hand pedals for turning the crank set of an arm driven tricycle have modular interchangeable components including a bearing which mounts on the spindle of the crank. A bridge connects the bearing to a handle. The bridge has two legs connected by a transverse spar. Different bridges and handles may be used having different sizes, shapes, lengths and angular orientations which allow the hand pedals to be customized to accommodate a particular user. Hand pedals may also be used on hand cranked bicycles, stationary hand cranked bicycles and industrial equipment.

23 Claims, 8 Drawing Sheets

(56) References Cited

U.S. PATENT DOCUMENTS

| | | | |
|---|---|---|---|
| 6,840,892 B1* | 1/2005 | Wu | A63B 22/0005 |
| | | | 482/62 |
| 7,530,932 B2* | 5/2009 | Lofgren | A63B 22/0002 |
| | | | 482/62 |
| 7,722,071 B1* | 5/2010 | Lofgren | B62K 5/02 |
| | | | 280/282 |
| 2003/0075002 A1* | 4/2003 | Peterson | B62M 1/14 |
| | | | 74/551.1 |
| 2008/0290628 A1* | 11/2008 | Tulpan | B62M 1/12 |
| | | | 280/234 |

* cited by examiner

HAND BICYCLE PEDAL

CROSS REFERENCE TO RELATED APPLICATION

This application is a national stage filing under 35 U.S.C. § 371 of International Application No. PCT/US2020/032428, filed on May 12, 2020, which based upon and claims priority to U.S. Provisional Application No. 62/847,035, filed May 13, 2019, the contents of which are incorporated herein by reference in their entireties.

FIELD OF THE INVENTION

This invention relates to hand pedals for exercise and sporting equipment.

BACKGROUND

Hand bicycles are tricycles that people with disabilities pedal with their arms by grasping "hand pedals" connected to a crank set. The crank set typically uses a chain drive to power one or more of the wheels upon rotation of the crank set by the user. Hand bicycles are in widespread use for exercise as well as in competitive racing sports similar to bicycling.

The hand pedals for hand bicycles according to the prior art have several significant short comings. For example, the spindle, which attaches the hand pedal to the crank set, is attached to the middle of the pedal. This configuration forces the user to use a weaker "open grasp" and frequently causes blisters. Furthermore, prior art hand pedals do not allow for adjustment of the pedal position to align with the center of the shoulder (i. e, adjustment to allow the arms to be in a neutral position to minimize risk of shoulder injury). Additionally, with the spindle attached to the middle of the hand pedal, it is difficult to align the center of rotation of the hand pedal with the forearm and the center of the wrist as the crank is turned. As a result, off axes loading of the wrist and radial/ulnar deviation occur, thereby increasing the risk of carpal tunnel syndrome, fatigue and pain. There is also no "modularity" of the prior art designs, meaning the various parts are not readily interchangeable to accommodate hand-size, hand functions, or the use of a prosthetic end-effector or splint. There is clearly an opportunity to improve upon hand pedals according to the prior art.

SUMMARY

The invention concerns a hand pedal attachable to a crank via a spindle having a longitudinal axis. In one example embodiment the hand pedal comprises a bearing mountable on the spindle. The bearing define an axis of rotation about the longitudinal axis. A bridge comprises a first leg attached to the bearing. The first leg is oriented transversely to the axis of rotation. A spar is attached to the first leg and extends transversely thereto. A handle is attached to the spar and extends transversely thereto.

In an example embodiment the bridge may further comprise a second leg attached to the spar and extending transversely thereto. The handle is attached to the spar via the second leg in this example. By way of further example the bearing comprises a bearing housing engageable with the spindle. A yoke engages the bearing housing, the first leg of the bridge being attached to the yoke. In another example embodiment the yoke comprises a clamp adjustably movable between a plurality of positions on the bearing housing along the axis of rotation. In a further example the first leg of the bridge is adjustably movable between a plurality of positions on the yoke in a direction toward and away from the axis of rotation. Also by way of example an orientation of the spar is angularly adjustable relatively to the first leg. In another example an orientation of the handle is angularly adjustable relatively to the spar. In a further example an orientation of the second leg is angularly adjustable relatively to the spar. In an example embodiment the handle is adjustably movable between a plurality of positions lengthwise along the second leg.

By way of example the handle may comprise a grip extending lengthwise along the second leg. A support surface may project transversely to the second leg in this example. Further by way of example the handle may comprise a grip extending transversely to the spar, and a palm swell may be positioned on the grip. In an example embodiment the first and second legs and the spar lie in a common plane. By way of example the first leg may be oriented at a fixed angle with respect to the spar and the second leg may be oriented at a fixed angle with respect to the spar. Further by way of example the first leg may be oriented perpendicularly to the axis of rotation.

In an example, the handle may further comprise a strap. The strap has a first end and a second end. The first end is attached to the handle distal to the support surface and the second end is attached to the support surface. In a particular example, the handle further comprises a first slot and a second slot. The first slot is located on the handle distal to the support surface and the second slot is located on the support surface. The first slot receives the first end and the second slot receives the second end. Further by way of example the handle may further comprise a guard attached to the support surface and extending therefrom. The guard is in spaced relation to the grip.

In a specific example embodiment the first leg is oriented at a first angle relatively to the axis of rotation, the second leg is oriented at a second angle relatively to the spar, the spar is oriented at a third angle relatively to the first leg, the handle is attached to the second leg at a distance from the spar, whereby a longitudinal axis of a forearm of a user gripping the handle passes through the axis of rotation.

In an example embodiment a hinge is positioned between the first leg and the spar. Further by way of example a hinge is positioned between the second leg and the spar. Another example embodiment comprises a plurality of holes positioned in space relation lengthwise along the first leg. A lug may extend from the yoke in an example, the lug defining at least one opening alignable with one of the holes. A fastener may be adapted to extend through the at least one opening and into one of the plurality of holes for positioning the first leg relatively to the axis of rotation.

An example may further comprise a plurality of holes positioned in spaced relation lengthwise along the second leg and the handle may define at least one opening alignable with one of the holes. A fastener may be adapted to extend through the at least one opening and into one of the plurality of holes for positioning the handle relatively to the second leg.

In an example embodiment encompassed by the invention an apparatus comprises a frame. A sprocket is mounted on the frame and is rotatable about a sprocket axis of rotation. At least one wheel is rotatably mounted on the frame. A transmission extends between the sprocket and the at least one wheel for transmitting torque from the sprocket to the at least one wheel. First and second cranks are attached to the sprocket on opposite sides thereof. First and second spindles are respectively attached to the first and second sprockets. Each spindle has a longitudinal axis. First and second hand pedals are respectively attached to the first and second spindles. At least the first hand pedal comprises a bearing mounted on the first spindle. The bearing defines an axis of rotation about the longitudinal axis of the first spindle. A bridge comprises a first leg attached to the bearing. The first leg is oriented transversely to the axis of rotation. A spar is attached to the first leg and extends transversely thereto. A handle is attached to the spar and extends transversely thereto.

In an example embodiment the bridge further comprises a second leg attached to the spar and extending transversely thereto. The handle is attached to the spar via the second leg in this example.

By way of example the bearing comprises a bearing housing engageable with the spindle. A yoke engages the bearing housing. The first leg of the bridge is attached to the yoke. In an example embodiment the yoke comprises a clamp adjustably movable between a plurality of positions on the bearing housing along the axis of rotation.

Further by way of example the first leg of the bridge is adjustably movable between a plurality of positions on the yoke in a direction toward and away from the axis of rotation. In another example an orientation of the spar is angularly adjustable relatively to the first leg. In a further example an orientation of the handle is angularly adjustable relatively to the spar Also by way of example an orientation of the second leg is angularly adjustable relatively to the spar. In an example embodiment the handle is adjustably movable between a plurality of positions lengthwise along the second leg.

In an example embodiment the handle comprises a grip extending lengthwise along the second leg. A support surface may project transversely to the second leg. By way of example the handle may further comprise a grip extending transversely to the spar and a palm swell may be positioned on the grip.

As an example, the handle may comprise a strap. The strap has a first end and a second end. The first end is attached to the handle distal to the support surface and the second end is attached to the support surface. In a particular example, the handle may further comprise a first slot and a second slot. The first slot is located on the handle distal to the support surface and the second slot is located on the support surface. The first slot receives the first end and the second slot receives the second end. Further by way of example the handle may further comprise a guard attached to the support surface and extending therefrom. The guard is in spaced relation to the grip.

In an example embodiment the first and second legs and the spar lie in a common plane. Further by way of example the first leg may be oriented at a fixed angle with respect to the spar and the second leg may be oriented at a fixed angle with respect to the spar. In an example the first leg may be oriented perpendicularly to the axis of rotation.

In a specific example embodiment the first leg is oriented at a first angle relatively to the axis of rotation, the second leg is oriented at a second angle relatively to the spar, the spar is oriented at a third angle relatively to the first leg, the handle is attached to the second leg at a distance from the spar, whereby a longitudinal axis of a forearm of a user gripping the handle passes through the axis of rotation.

An example embodiment may further comprise a hinge positioned between the first leg and the spar. An example embodiment may further comprise a hinge positioned between the second leg and the spar.

In an example embodiment a plurality of holes are positioned in space relation lengthwise along the first leg. A lug extends from the yoke, the lug defining at least one opening alignable with one of the holes. A fastener may be adapted to extend through the at least one opening and into one of the plurality of holes for positioning the first leg relatively to the axis of rotation. Further by way of example a plurality of holes may be positioned in spaced relation lengthwise along the second leg. The handle defines at least one opening alignable with one of the holes and a fastener may be adapted to extend through the at least one opening and into one of the plurality of holes for positioning the handle relatively to the second leg.

In one example embodiment the apparatus comprises a bicycle. In another example the apparatus comprises a tricycle. In a further example the apparatus comprises a stationary exercise bicycle.

The invention further encompasses a kit for a hand pedal attachable to a crank via a spindle having a longitudinal axis. In one example embodiment the kit comprises a bearing mountable on the spindle. The bearing defines an axis of rotation about the longitudinal axis. A plurality of bridges are provided. By way of example each bridge comprises a first leg removably attachable to the bearing, a spar attached to the first leg and extending transversely thereto and a second leg attached to the spar and extending transversely thereto. The example kit may further include a plurality of handles removably attachable to the second leg of any of the plurality of bridges.

In an example embodiment at least two of the bridges are different from each other according to a parameter selected from the group consisting of a length of the first leg, a length of the second leg, a length of the spar, an orientation angle between the first leg and the spar, an orientation angle between the second leg and the spar, and combinations thereof. By way of example at least two of the handles are different from one another according to a parameter selected from the group consisting of a length of the handle, a shape of the handle, and combinations thereof.

DETAILED DESCRIPTION

Figure 1:
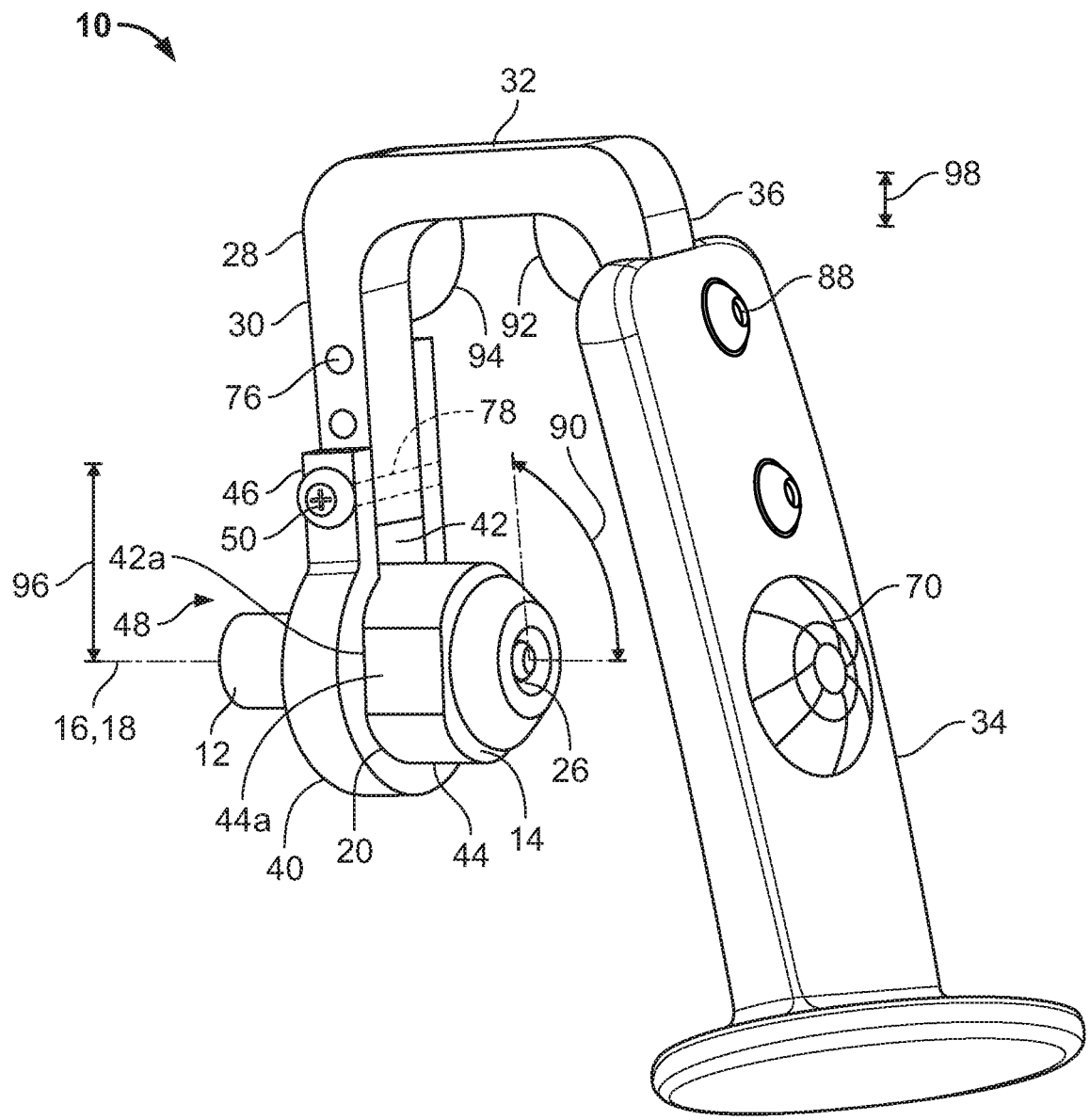
FIG. 1 is an isometric view of an example embodiment of a hand pedal according to the invention.
Figure 2:
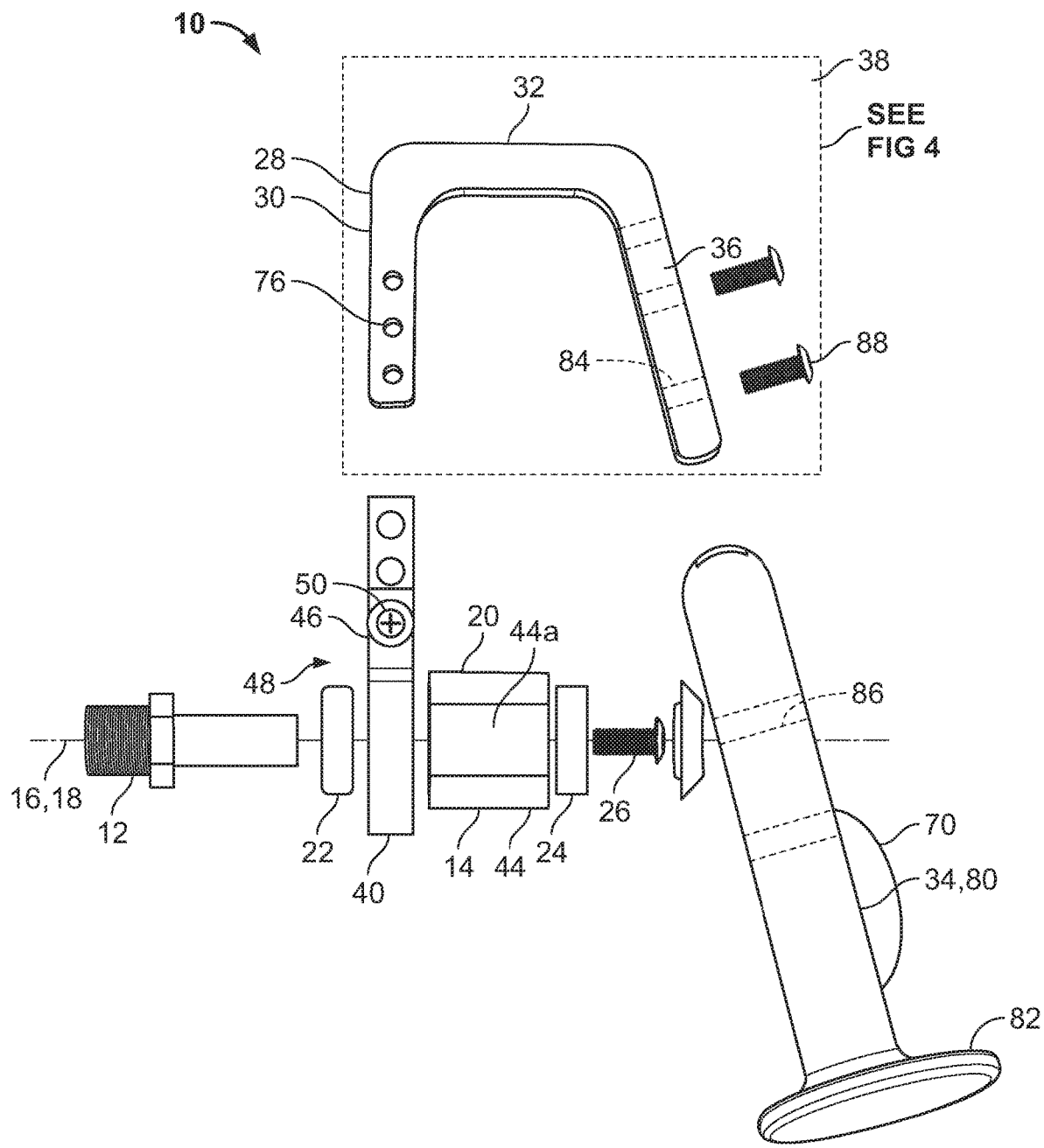
FIG. 2 is an exploded side view of the hand pedal shown in FIG. 1.

FIGS. 1 and 2 show an example embodiment of a hand pedal 10 according to the invention. Hand pedal 10 is attachable to a spindle 12 of a crank (not shown) and comprises a bearing 14. Bearing 14 is mountable on spindle 12 and defines an axis of rotation 16 about a longitudinal axis 18 of the spindle. In this example the rotational axis 16 is coaxially aligned with the longitudinal axis 18. By way of example, bearing 14 may comprise a bearing housing 20 which engages the spindle 12 through ball bearing assemblies 22, 24 (balls and races); see FIG. 2. A threaded fastener 26 engages the spindle 12 to retain the bearing 14 on the spindle.

A bridge 28 is attached to the bearing 14. Bridge 28 comprises a first leg 30. A spar 32 is attached to the first leg and extends transversely to it. A handle 34 is attached to the spar 32. Handle 34 may be attached directly to the spar, or, as shown in the example embodiment, the handle 34 is attached to a second leg 36 which is attached to the spar 32. Second leg 36 extends transversely to spar 32. In one example of a practical design (FIG. 2), the bridge 28 comprises a unitary piece which includes the first and second legs 30 and 36 and the spar 32, all of which lie in a common plane 38.

As shown in FIG. 1 and FIG. 2, attachment of bridge 28 to bearing 14 in this example is effected using a yoke 40. Yoke 40 surrounds and engages the bearing housing 20 and may have an inner surface 42 with a shape matched to the outer surface 44 of bearing housing 20. In this example the inner and outer surfaces 42 and 44 have matching flats 42a and 44a which prevent relative rotation between the yoke 40 and the bearing housing 20. Additionally, yoke 40 comprises a lug 46 which extends from the yoke, thereby forming a clamp 48 which is actuated using a fastener 50 to deform the yoke into engagement with the bearing housing and thereby secure the yoke to a position on the housing using friction.

Figure 3:
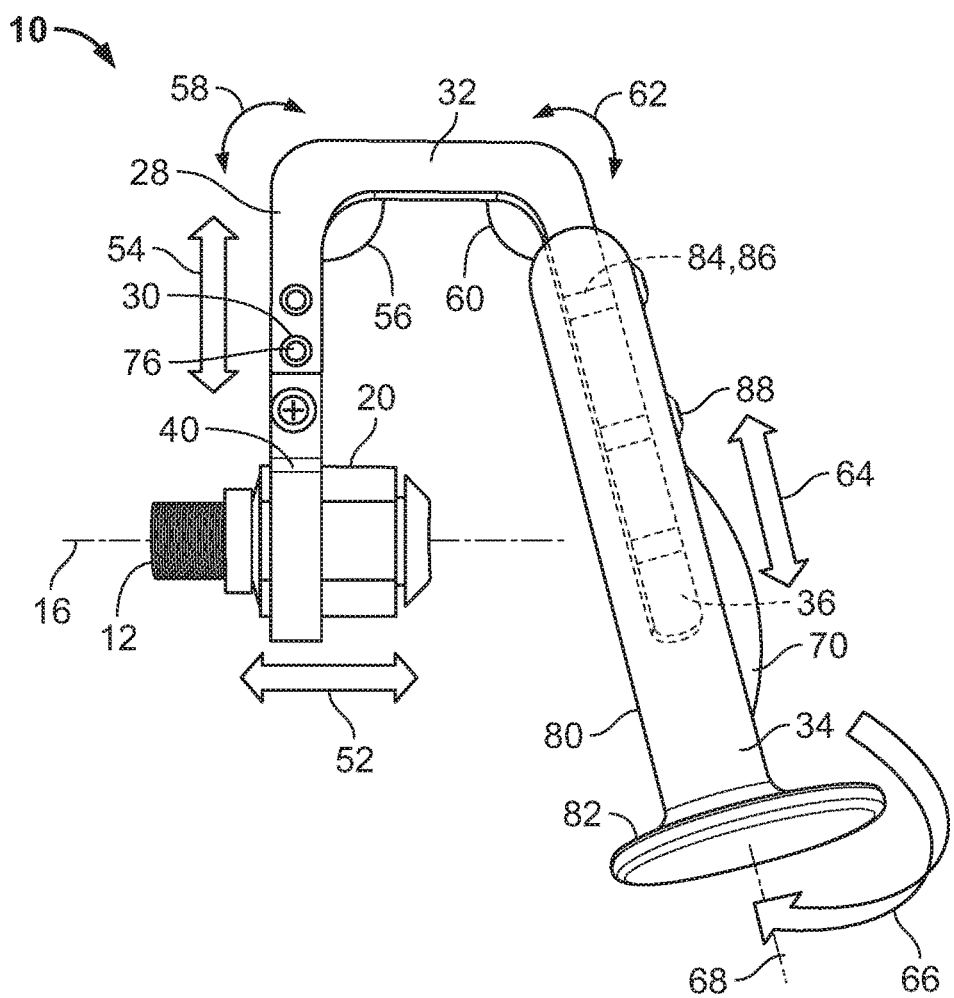
FIG. 3 is a side view of an example hand pedal showing various adjustable parameters.

FIG. 3 illustrates various parameters of adjustability for the hand pedal 10. The parameters include adjusting the position of yoke 40 between a plurality of positions on bearing housing 20 as indicated by arrow 52; adjusting the position of first leg 30 toward and away from the axis of rotation 16 as indicated by arrow 54; adjusting the orientation angle 56 between the first leg 30 and spar 32 as indicated by arrow 58; adjusting the orientation angle 60 between spar 32 and the second leg 36 as indicated by arrow 62; adjusting the position of handle 34 along the second leg 36, both lengthwise along the second leg and rotationally about it as indicated by arrows 64 and 66 respectively. Rotational adjustment 66 of handle 34 is advantageous when the handle is not symmetric about its longitudinal axis 68, as, for example when it has a palm swell 70 or another ergonomically adaptive shape.

These parameters 52, 54, 58, 62, 64 and 66 are adjustable to accommodate a particular user to improve the efficiency and comfort of the human-machine interface. The parameters may be adjusted by assembling selected components having the desired fixed lengths and angular orientations in a "modular" assembly, or using components which are themselves adjustable and tuning the assembly to have the desired characteristics as described below.

Figure 4:
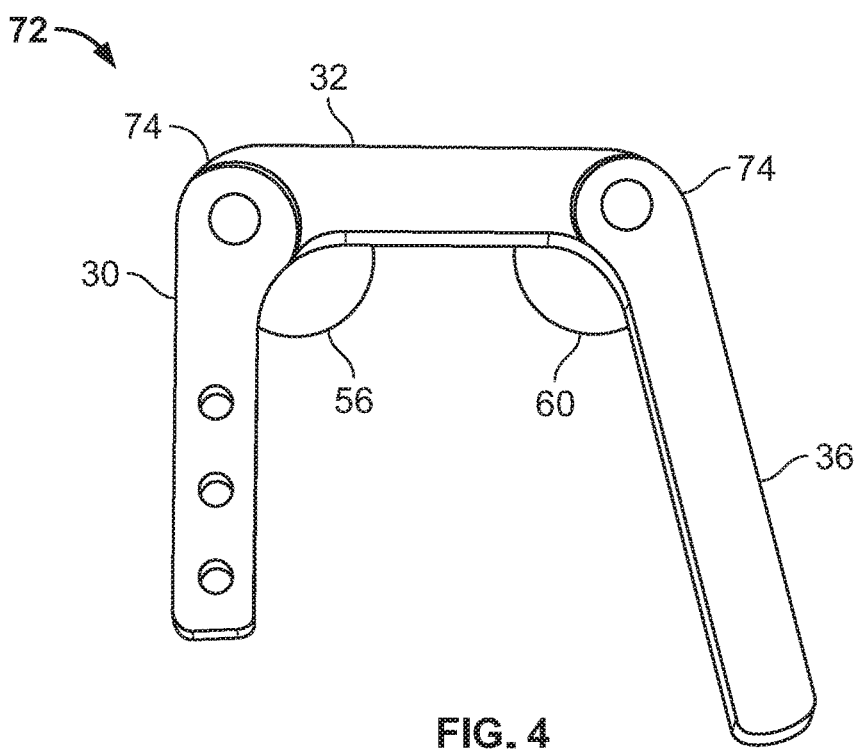
FIG. 4 is a plan view of an example component for a hand pedal according to the invention.

FIG. 3 shows a bridge 28 wherein both the orientation angle 58 between the first leg 30 and the spar 32 and the orientation angle 60 between the second leg 36 and spar 32 are fixed. Thus, to effect adjustment of parameters 58 and 60 in this case one would select a bridge 28 from a plurality of bridge designs, the selected bridge having the desired orientation angles 58 and 60. This selected bridge 28 would then become a modular component assembled into a hand pedal 10 customized for a particular user. In an alternate embodiment, a bridge 72 as shown in FIG. 4 could be used. In this embodiment, either or both the first and second legs 30 and 36 may be attached to the spar 32 using hinges 74, the hinges allowing for adjustment and fixing of the orientation angles 56 and 60, for example using fasteners and friction, splines or set screws to cite a few examples.

FIGS. 1 and 3 illustrate an example embodiment for adjusting parameter 52, the position of the yoke 40 among a plurality of positions on bearing housing 20 along the axis of rotation 16. As noted above, the yoke 40 and lug 46 behave as a clamp 48 which fixes the location of the yoke on the housing 20 when the clamping fastener 50 is tightened. FIGS. 1, 2 and 3 illustrate an embodiment for adjusting parameter 54, the position of the first leg 30 with respect to the axis of rotation 16. In this example, the first leg 30 has a plurality of holes 76 in spaced relation lengthwise along the first leg. The holes 76 are engageable by the fastener 50 of lug 46, which extends through the opening 78 defined by the lug for positioning the first leg 30 relatively to the axis of rotation 16. FIGS. 2 and 3 also show an embodiment for adjusting parameter 64, the position of the handle 34 lengthwise along the second leg 36. In this example embodiment the handle 36 comprises a grip 80 extending lengthwise along the second leg 36 and transversely to the spar 32, a palm swell 70 extending from the surface of the grip, and a support surface 82 which projects from the grip transversely to the second leg 36. A plurality of holes 84 are positioned in spaced relation lengthwise along the second leg 36. The grip 80 of handle 34 defines at least one opening 86 which is alignable with any of the holes 84. A fastener 88 is adapted to extend through the opening 86 and engage one of the holes 84 to position the handle 34 (grip 80) relatively to the second leg 36. In this example there are two fasteners 88 which engage respective openings 86 in the grip 80 and holes 84 in the second leg 36.

Figure 5:
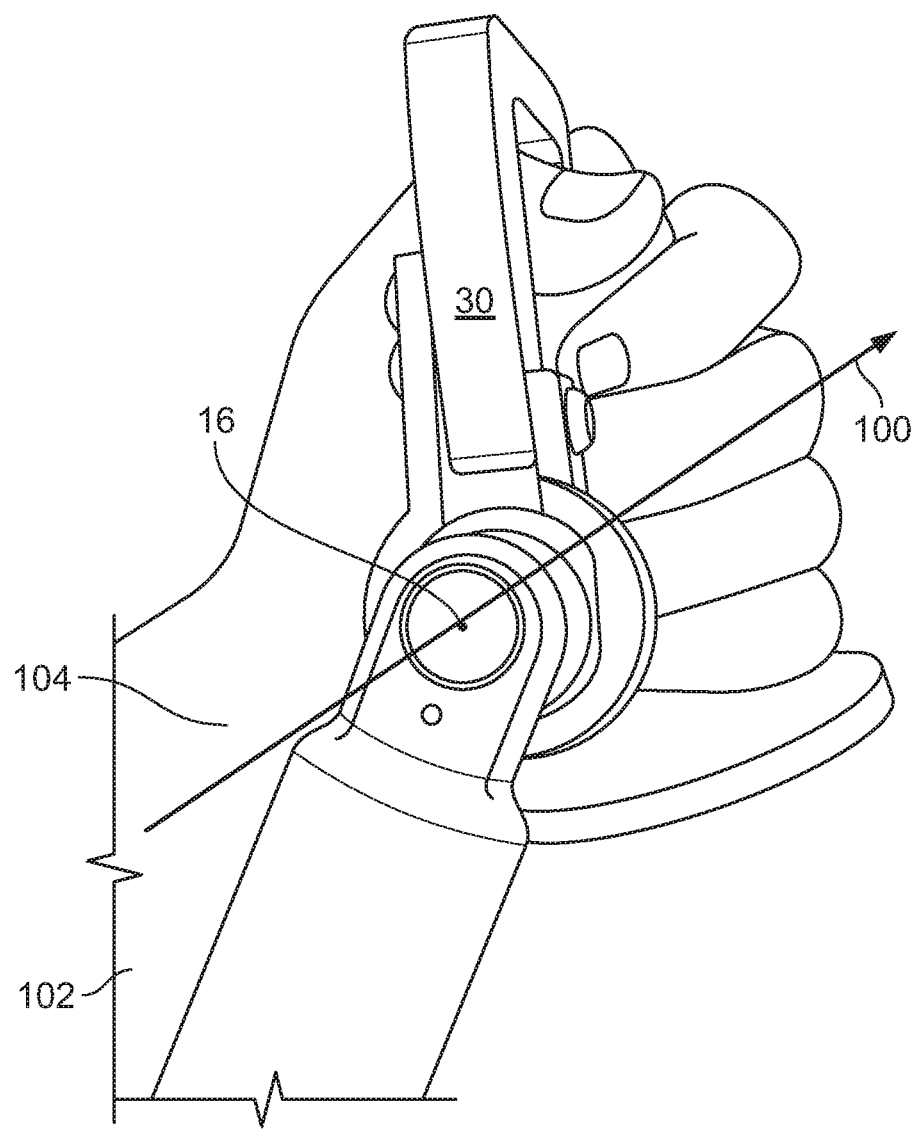
FIG. 5 is an end view of an example hand pedal in use.

FIGS. 1 and 5 illustrate a particular embodiment of the hand pedal 10 according to the invention wherein the first leg 30 is oriented at a first angle 90 relatively to the axis of rotation 16 (in this example, perpendicular thereto), the second leg 36 is oriented at a second angle 92 relatively to spar 32, the spar 32 is oriented at a third angle 94 relatively to the first leg 30, the first leg 30 is attached to the yoke 40 at a distance 96 away from the axis of rotation 16 and the handle 34 (grip 80) is attached to the second leg at a distance 98 from the spar 32 such that a longitudinal axis 100 of the forearm 102 of a user passes through the axis of rotation 16. Parameters which achieve this relationship between forearm axis 100 and the rotational axis 16 are expected to provide significant advantage because this relationship permits the wrist 104 to remain in a neutral position during cranking thereby allowing the wrist muscles to rest, there being no off-axis torques imposed The hand pedal 10 according to the invention is readily adaptable to various users having different physical characteristic due to its modular design, illustrated in FIG. 2. Bridge 28 and handle 34 are components which may be effectively varied to accommodate different users. To that end the hand pedal 10 may be provided in the form of a kit comprising the bearing 10 and a plurality of bridges 28 having first and second legs 30 and 36 and spars 32 of different lengths and orientation angles 56, 60, as well as handles 34 of different sizes and shapes. Such a kit will allow a hand pedal 10 to be custom fitted and assembled, appropriate to the characteristics of a specific user.

Figure 6:
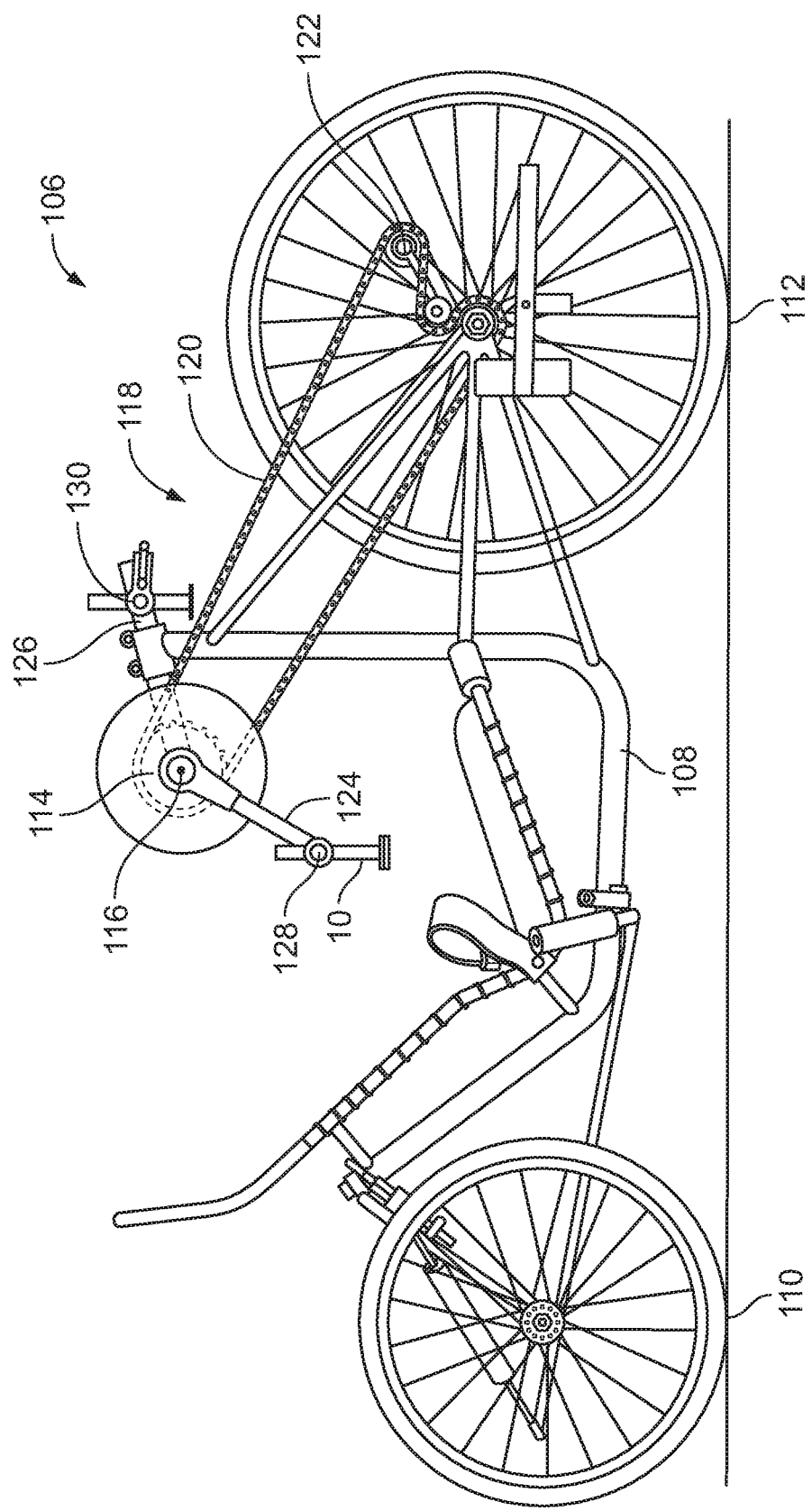
FIG. 6 is a side view of a bicycle or tricycle using hand pedals according to the invention.
Figure 7:
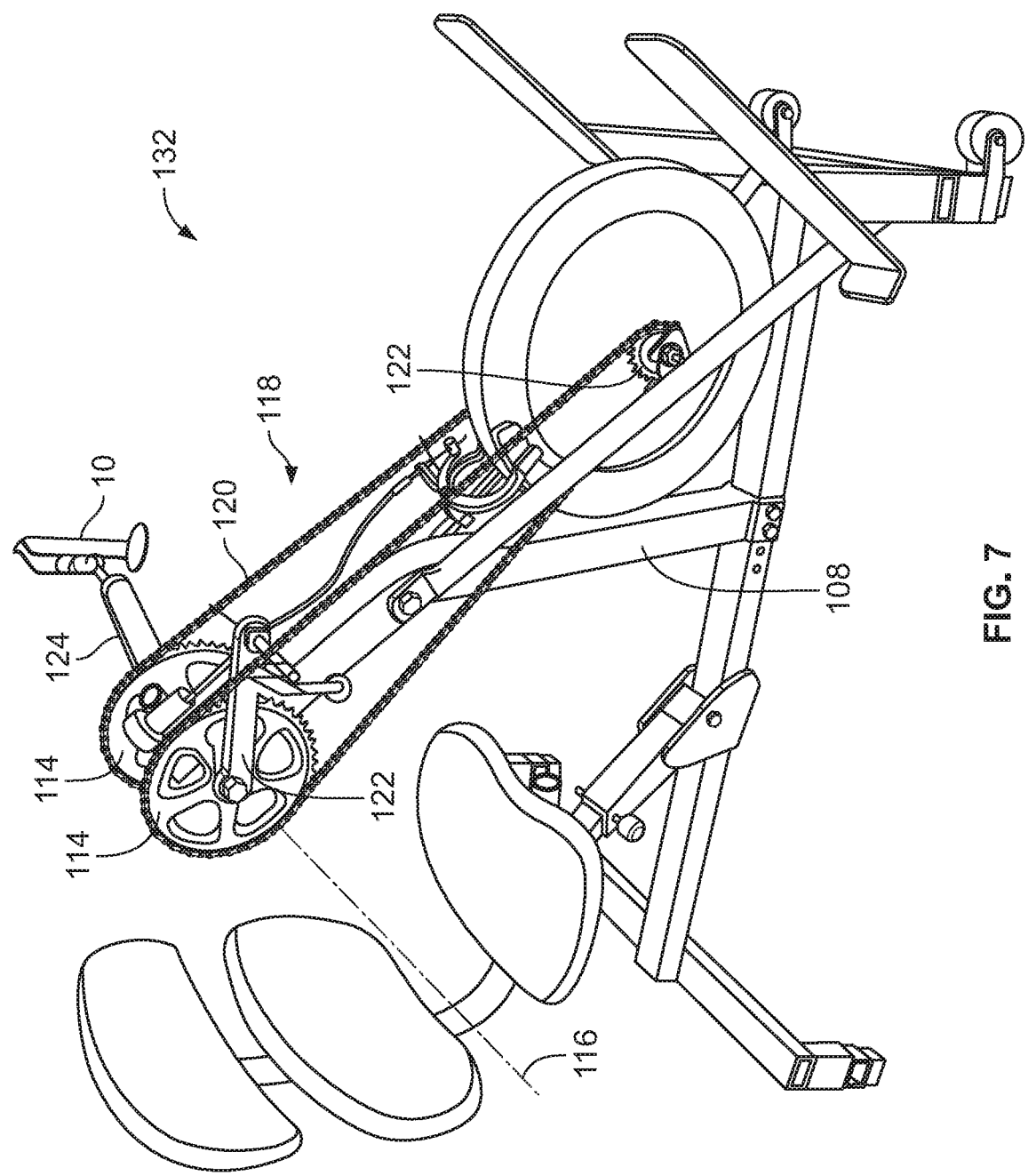
FIG. 7 is an isometric view of an exercise bicycle using a hand pedals according to the invention.
Figure 8:
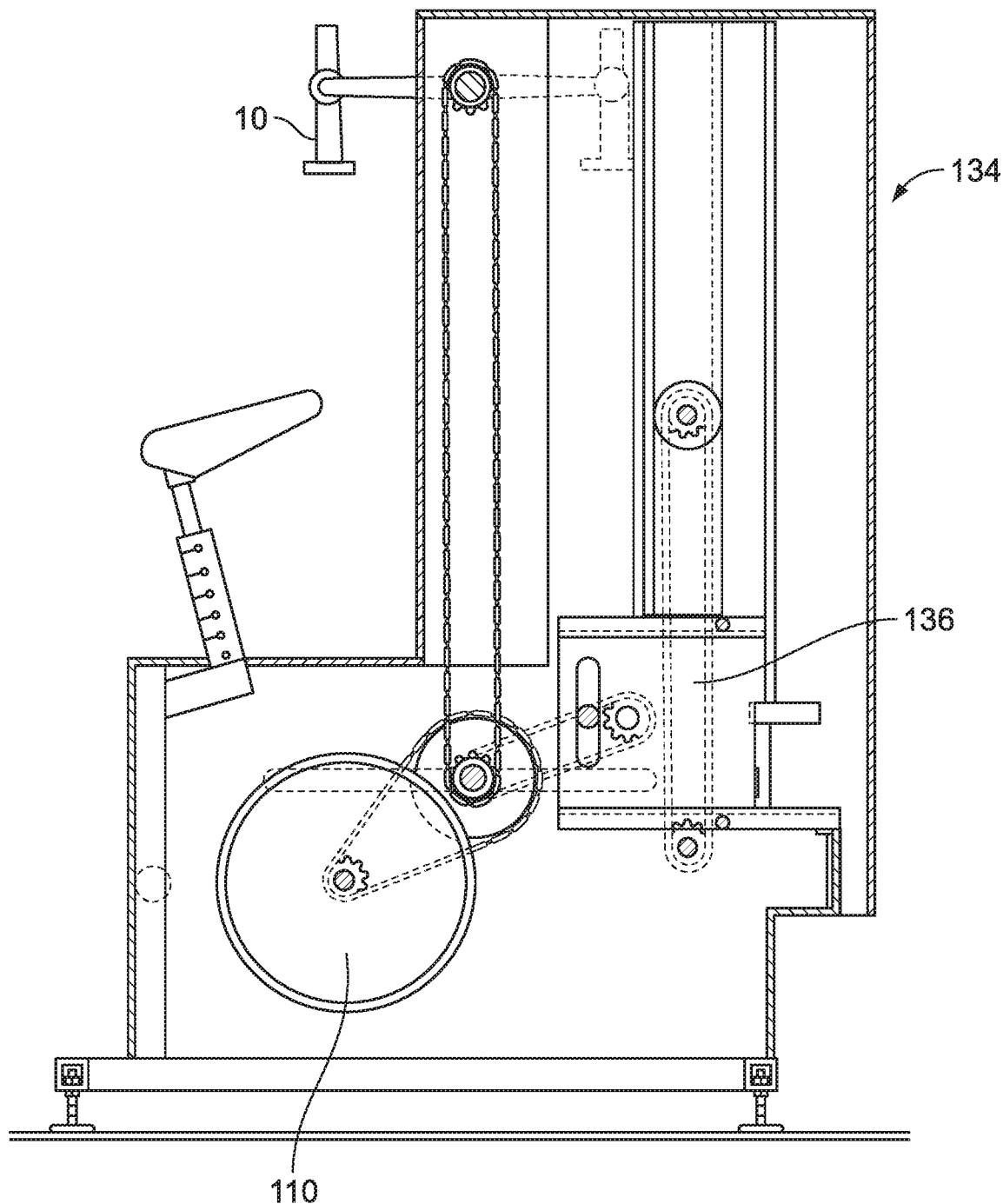
FIG. 8 is a side view of a manually operated industrial apparatus using hand pedals according to the invention.

Hand pedals according to the invention are versatile and may be adapted for use with any manually operated apparatus which uses a crank to generate torque. FIG. 6 shows an apparatus, in this example a bicycle (or a tricycle) 106. Bicycle 106 comprises a frame 108 on which wheels 110, 112 are rotatably mounted. A sprocket 114 is also mounted on frame 108 for rotation about a sprocket axis of rotation 116. A transmission 118, in this example comprising a chain 120, derailleur and wheel sprockets 122 extend between the sprocket 114 and the wheel 112 for transmitting torque from the sprocket to the wheel. First and second cranks 124, 126 are mounted on opposite sides of the sprocket 114, and hand pedals 10 according to the invention are attached to the cranks via first and second spindles 128 and 130. FIG. 7 shows a stationary exercise "bicycle" 132 wherein hand pedals 10 are attached to cranks 122, 124 affixed to dual sprockets 114 mounted on the frame 108 for rotation about axis 116. Transmission 118 again employs a chain 120 extending between sprocket 114 and a wheel sprocket 122. FIG. 8 shows an apparatus 134 for crushing cans which uses hand pedals 10 to turn a flywheel 110 and operate a press 136.

Figure 9:
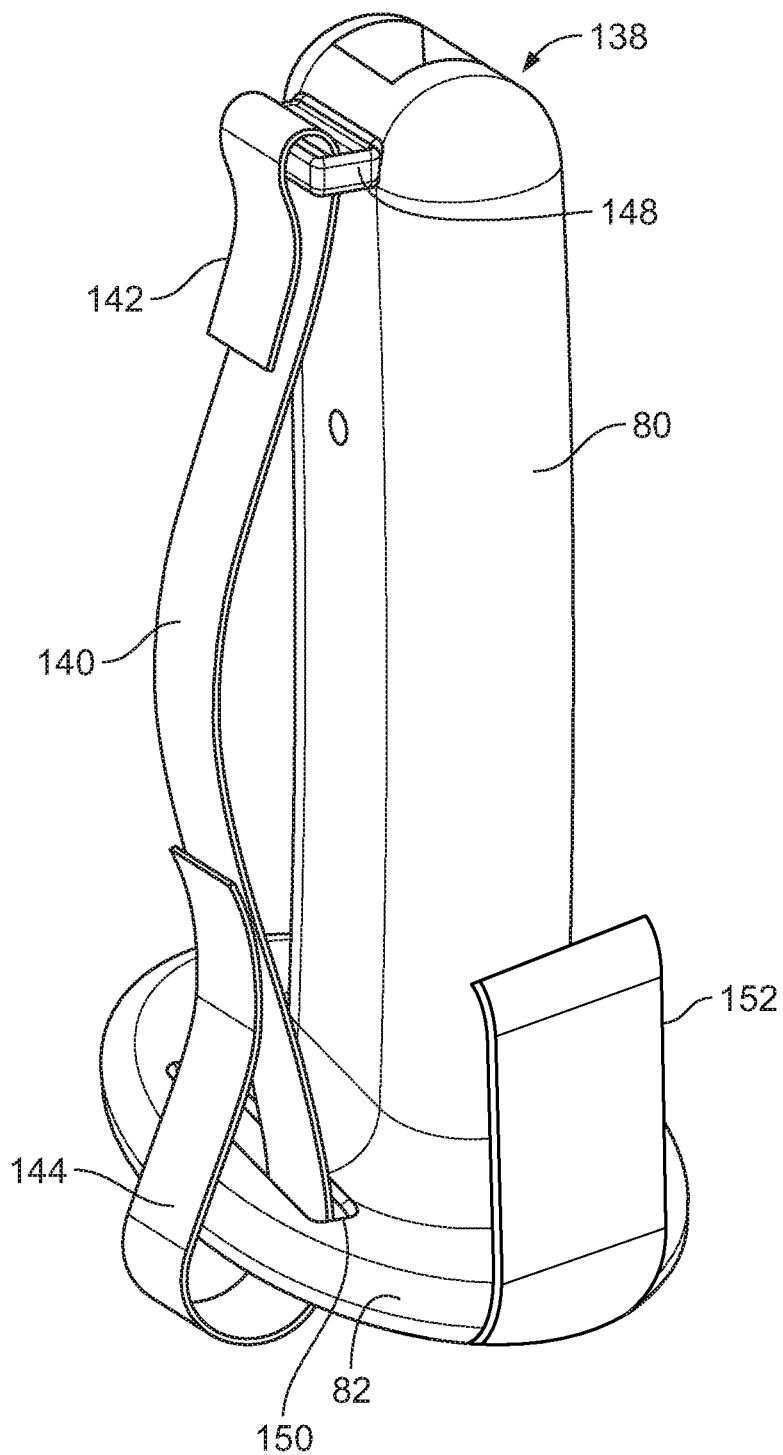
FIG. 9 is an isometric view of an example handle for a hand pedal according to the invention.

FIG. 9 shows an embodiment of the hand pedal 10 comprising a handle 138 that is attachable to spar 32 (not shown). Handle 138 comprises a strap 140 having first and second ends, 142 and 144. The first end 142 is attached to the handle 138 distal to the support surface 82. The second end 144 is attached to the support surface 82. Handle 138 also comprises first and second slots, 148 and 150. The first slot 148 is located on handle 138 distal to the support surface 82 and receives the first end 142 of strap 140. The second slot 150 is located on the support surface 82 and receives the second end 144 of strap 140. In another example, handle 138 may further comprises a guard 152. The guard 152 is attached to the support surface 82 and extends therefrom. The guard 152 is in spaced apart relation to the grip 80.

Hand pedals according to the invention are expected to provide various advantages including: improved efficiency of energy transfer from the user to the device upon which the hand pedal is mounted; mitigation of shoulder injuries by affording better alignment with the shoulder center, mitigation of the potential for carpal tunnel syndrome through better alignment with the forearm and wrist, and the minimizing of frictional lesions such as blisters.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hand pedal attachable to a crank via a spindle having a longitudinal axis, said hand pedal comprising:
a bearing mountable on said spindle, said bearing defining an axis of rotation about said longitudinal axis, said bearing comprises a bearing housing engageable with said spindle;
a bridge comprising a first leg attached to said bearing, said first leg being oriented transversely to said axis of rotation, a spar attached to said first leg and extending transversely thereto;
a handle attached to said spar and extending transversely thereto, wherein
a yoke engages said bearing housing, said first leg of said bridge being attached to said yoke.

2. The hand pedal according to claim 1, wherein said bridge further comprises a second leg attached to said spar and extending transversely thereto, said handle being attached to said spar via said second leg.

3. The hand pedal according to claim 2, wherein an orientation of said second leg is angularly adjustable relatively to said spar.

4. The hand pedal according to claim 2, wherein said handle is adjustably movable between a plurality of positions lengthwise along said second leg.

5. The hand pedal according to claim 2, wherein said handle comprises:
a grip extending lengthwise along said second leg;
a support surface projecting transversely to said second leg.

6. The hand pedal according to claim 5, wherein said handle further comprises:
a strap having a first end attached to said handle distal to said support surface, said strap having a second end attached to said support surface.

7. The hand pedal according to claim 6, wherein said handle further comprises:
a first slot located on said handle distal to said support surface, said first slot receiving said first end; and
a second slot located on said support surface, said second slot receiving said second end.

8. The hand pedal according to claim 5, wherein said handle further comprises:
a guard attached to said support surface extending therefrom, said guard is in spaced relation to said grip.

9. The hand pedal according to claim 2, wherein said first and second legs and said spar lie in a common plane.

10. The hand pedal according to claim 9, wherein said first leg is oriented at a fixed angle with respect to said spar.

11. The hand pedal according to claim 9, wherein said second leg is oriented at a fixed angle with respect to said spar.

12. The hand pedal according to claim 9, wherein said first leg is oriented perpendicularly to said axis of rotation.

13. The hand pedal according to claim 2, wherein:
said first leg is oriented at a first angle relatively to said axis of rotation;
said second leg is oriented at a second angle relatively to said spar;
said spar is oriented at a third angle relatively to said first leg;
said handle is attached to said second leg at a distance from said spar; whereby
a longitudinal axis of a forearm of a user gripping said handle passes through said axis of rotation.

14. The hand pedal according to claim 2, further comprising a hinge positioned between said second leg and said spar.

15. The hand pedal according to claim 2, further comprising:
a plurality of holes positioned in spaced relation lengthwise along said second leg;
said handle defining at least one opening alignable with one of said holes;
a fastener adapted to extend through said at least one opening and into one of said plurality of holes for positioning said handle relatively to said second leg.

16. The hand pedal according to claim 1, wherein said yoke comprises a clamp adjustably movable between a plurality of positions on said bearing housing along said axis of rotation.

17. The hand pedal according to claim 1, wherein said first leg of said bridge is adjustably movable between a plurality of positions on said yoke in a direction toward and away from said axis of rotation.

18. The hand pedal according to claim 1, wherein an orientation of said spar is angularly adjustable relatively to said first leg.

19. The hand pedal according to claim 1, wherein an orientation of said handle is angularly adjustable relatively to said spar.

20. The hand pedal according to claim 1, wherein said handle comprises:
   a grip extending transversely to said spar;
   a palm swell positioned on said grip.

21. The hand pedal according to claim 1, further comprising a hinge positioned between said first leg and said spar.

22. The hand pedal according to claim 1, further comprising:
   a plurality of holes positioned in space relation lengthwise along said first leg;
   a lug extending from said yoke, said lug defining at least one opening alignable with one of said holes;
   a fastener adapted to extend through said at least one opening and into one of said plurality of holes for positioning said first leg relatively to said axis of rotation.

23. A hand pedal attachable to a crank via a spindle having a longitudinal axis, said hand pedal comprising:
   a bearing mountable on said spindle, said bearing defining an axis of rotation about said longitudinal axis;
   a bridge comprising a first leg attached to said bearing, said first leg being oriented transversely to said axis of rotation, a spar attached to said first leg and extending transversely thereto;
   a handle attached to said spar and extending transversely thereto; and
   a hinge positioned between said first leg and said spar.

* * * * *